United States Patent [19]

Searfoss et al.

[11] Patent Number: 4,898,212

[45] Date of Patent: Feb. 6, 1990

[54] FATIGUE RESISTANT HOSE

[75] Inventors: Jerry R. Searfoss, Stow; Bernard Keister, Aurora, both of Ohio

[73] Assignee: Eaton Corporation, Cleveland, Ohio

[21] Appl. No.: 656,202

[22] Filed: Oct. 1, 1984

[51] Int. Cl.⁴ .............................................. F16L 11/04
[52] U.S. Cl. .................................. 138/130; 138/124; 138/125
[58] Field of Search ............... 138/124, 125, 126, 130, 138/172

[56] References Cited

U.S. PATENT DOCUMENTS

| | | | |
|---|---|---|---|
| 3,905,398 | 9/1975 | Johansen et al. | 138/125 X |
| 4,131,757 | 12/1978 | Felkel | 138/130 X |
| 4,196,464 | 4/1980 | Russell | 138/130 X |
| 4,259,991 | 4/1981 | Kutnyak | 138/125 X |
| 4,317,000 | 2/1982 | Ferer | 138/130 X |

Primary Examiner—James E. Bryant, III

Attorney, Agent, or Firm—Fay, Sharpe, Beall, Fagan, Minnich & McKee

[57] ABSTRACT

Disclosed are embodiments (30, 40, 50) of a flexible reinforced hose that is provided with substantial improvement in flex fatigue resistance by incorporating at least one pair of oppositely helically wound layers of fiberous reinforcement about core tube (1) having a singular wall or a core tube having a composite wall (15, 16) of fibers (3) having a tenacity of about 12 to about 25 grams for denier and an elongation at break of about 2% to about 8% that are disposed in alternating contiguous relationship to fibers (4) having a tenacity of from about 7 to 11 grams per denier and an elongation at break of about 9% to about 17%. The hose may include other helically covered and/or braided layers of reinforcement, preferably includes a protective covering jacket (8) and may or may not include structure such as an adhesive for bonding one or more of the reinforcement layers or the entire construction together.

8 Claims, 2 Drawing Sheets

FATIGUE RESISTANT HOSE

INTRODUCTION

This invention relates generally to a flexible synthetic fiber reinforced hose adapted to convey fluids under pressure and more particularly to a synthetic fiber reinforced hose that is provided with improved resistance to flexural fatigue associated with flexing and pressure cycling.

BACKGROUND OF THE INVENTION

The use of synthetic fiber reinforced hose for the conveyance of fluids under pressure is well known. Synthetic fiber reinforced hose characteristically exhibits better resistance to fatigue under pressure pulsation and flexing conditions than does hose that is reinforced with metallic wire which also has been used as hose reinforcement for many years.

Until recent time, fibrous reinforced hose has been limited in its pressure carrying capacity because of the strength limitations inherently associated with fibers made from conventional synthetic materials such as rayon, aliphatic nylon, cotton and poly(alkyene-terephthalate)ester such as poly(ethylene-terephthalate)ester sold by the Dupont Company under the trademark "Dacron".

More recently, the introduction of a higher strength aromatic polyamide fiber sold under the Trademark "Fiber B" or "Kevlar" by the Dupont Company and described under U.S. Pat. No. 3,600,350, the disclosure of which is incorporated herein by reference, has enabled hose designers to substantially increase the pressure bearing capabilities of synthetic fiber reinforced hose without having to increase the fiber bulk reinforcing the hose. Fibers spun from "Kevlar" aromatic polyamide filaments have a high tensile modulus (generally expressed as tenacity) of from about 12 to about 25 grams per denier, with an average of about 20 grams per denier and an elongation at break of about 2% to about 8% with an average of between 2% and 4%.

The "tenacity" of fiber is determined from the equation:

$$\text{tenacity} = \frac{\text{breaking strength of the filament in grams}}{\text{denier}}$$

Although high strength synthetic fibers made from materials such as "Kevlar" can be used to advantage in hose design by substantially increasing the burst strength of the hose without having to use more fiber than an equivalent hose reinforced for example with "Dacron" polyester fiber, it has been discovered that hoses reinforced solely with fibers made from aromatic polyamide such as "Kevlar" and hoses that feature random mixing or separate layers of Kevlar with other types of fiber exhibit a tendency to fail prematurely under flexing conditions in comparison for example to equivalent hoses reinforced solely with "Dacron" or aliphatic nylon or polyvinyl alcohol fibers having a tenacity falling within the range of from about 7 to 11 grams per denier and an elongation at break of about 9% to about 17%.

Although the prior art for example disclosed in U.S. Pat. Nos. 3,905,398 and 4,343,333, the disclosures of which are incorporated herein by reference, suggests the use of composite layers of fibers such as "Kevlar" and "Dacron" or other lower tenacity fibers, it has remained unclear as to what the relationship between such fibers within a single layer of reinforcement should be in order to optimize the flexural fatigue resistance of hose.

Therefore, even though prior art has contemplated synthetic fiber hose reinforcement comprising a composite of different fibers, a need has existed to determine the precise relationship between higher tenacity fibers such as "Kevlar" and lower tenacity fibers such as "Dacron" within a single hose reinforcement layer.

SUMMARY OF THE INVENTION

Accordingly, it is an object of this invention to provide a flexible synthetic fiber reinforced hose having improved resistance to flexural fatigue.

It is another object of this invention to provide a flexible hose that utilizes a combination of low and high tenacity fibers as a means of improving its resistance to flex fatigue.

It is still another object of this invention to provide a flexible reinforced hose having improved resistance to flex fatigue arising as a result of the relationship between low and high tenacity fibers within a particular reinforcement layer.

BRIEF DESCRIPTION OF THE DRAWINGS

FIG. 1 shows a cross-section 6—6 of the hose embodiment of FIG. 1; and

DETAILED DESCRIPTION OF SOME PREFERRED EMBODIMENTS

Figure 1:
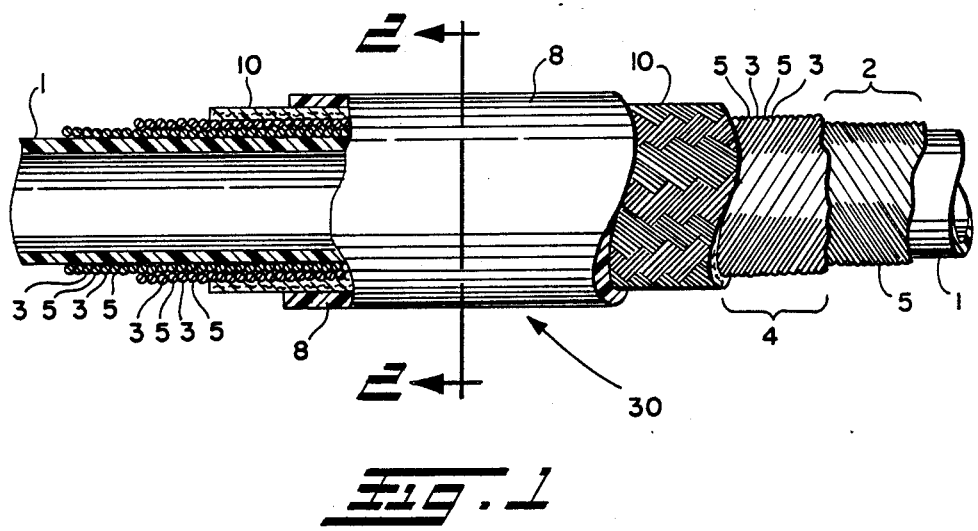
FIG. 1 shows a partially cut away side elevation view of an embodiment of hose made in accordance with the invention.
Figure 2:
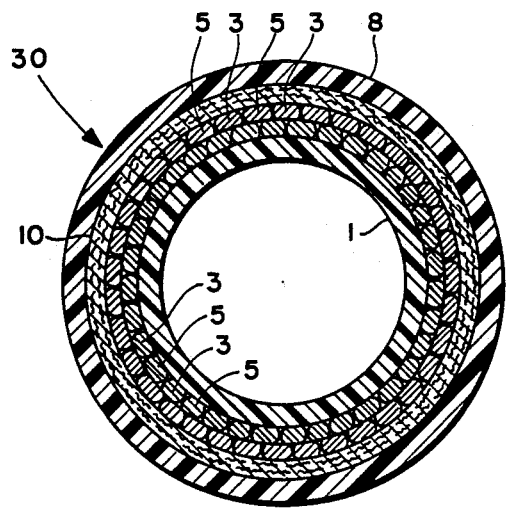

FIGS. 1 and 2 show flexible reinforced hose 30 of the invention. Hose 30 has a core tube 1 made from a material resistant to the fluid being conveyed under pressure by hose 30. Core tube 1 is preferably made from an extruded polymeric material including nylon, particularly nylon 11, thermoplastic elastomeric polyurethane and, thermoplastic elastomeric elastomer such as sold by the Dupont company under the tradename "Hytrel" as is well known to those skilled in the art of hose design utilizing polymeric materials.

Core tube 1 is surrounded by oppositely helically wound inner layer 2 and outer layer 4 of tensioned fibers hereinafter described in greater detail. Fiberous reinforcement layer 4 is surrounded by a braided layer 10 of tensioned fibers, hereinafter described which in turn is surrounded by protective jacket 8, hereinafter described, which is made from a flexible material adapted to protect reinforcement layers 2 and 4 from damage.

Layers 2 and 4 are comprised of alternating contiguous first fiber 3 and second fiber 5 that remain in substantially parallel relationship to each other as they wind helically about core 1.

Fiber 3 is made from a plurality of high strength synthetic monofilaments providing a tenacity of from about 12 to about 25 grams per denier and an elongation at break of about 2% to about 8%. As previously described, fiber 3 is preferably made from an aromatic polyamide such as sold under the trademark "Kevlar" previously described.

Figure 3:
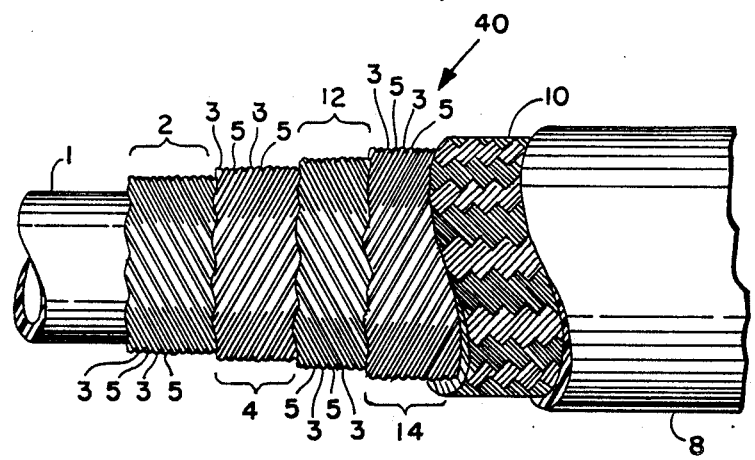
FIGS. 3 and 4 show respective partially broken away side elevation views of two more embodiments of hose made in accordance with the invention.
Figure 4:
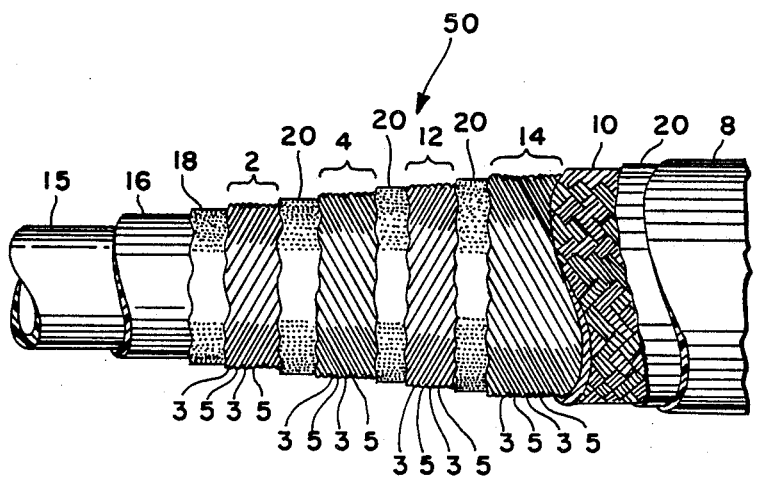

Layers 2 and 4 of FIG. 1 as well as layers 12 and 14 of FIGS. 3 and 4 are each termed what is known as "half laps" in the trade. Oppositely wound helical layers of fibers are normally used in pairs in hose construction so as to counterbalance torsional twist that may occur when the hose is conveying fluid under pressure.

Fiber 3 as well as fiber 5 of helical layers 2 and 4 of FIG. 1 and helical layers 2, 4, 12 and 14 of FIGS. 3 and 4, as well as braided layer 10 of FIGS. 1-4, are each comprised of selected deniers of fiber where denier is a term relating to the weight of the fiber per a given length and is reflective of the number of monofilaments present. Generally, the larger the denier, the greater the number of monofilaments present and the heavier the fiber. Several deniers of a given fiber are usually available from their respective manufacturers and the user may combine deniers to provide the amount of fiber desired for a particular application. For example, 1000 and 1100 denier polyester fiber sold under the tradename "Dacron" and 1500 denier aromatic polyamide sold under the trademark "Kevlar" are presently available and are commonly used by hose manufacturers.

In addition to variations in denier, fibers can usually be purchased either without twist or with a limited amount of twist in the deniers standardly available. Fiber manufacturers generally limit the amount of twist in standard deniers to 1.5 turns per inch or less. In the trade, a clockwise twist is designated a "Z" twist and a counterclockwise twist is designated an "S" twist. The user may, of course, combine deniers and increase the amount of twist for particular advantages such as for example the surprising improvement in flexural fatigue of "Kevlar" fiber disclosed in U.S. Pat. No. 4,343,333, the disclosure of which is incorporated herein by reference and which is assigned to the assignee of the present invention.

Second fiber 5 is made from lower strength synthetic fiber having a tenacity of from about 7 to 11 grams per denier and an elongation at break of from about 9% to about 17%. A fiber found particularly suitable is "Dacron" polyester previously described although other fibers having a tenacity and elongation at break falling within the indicated range for second fiber 5 may be used where desired for a particular application.

Layer 10 is a braided layer of reinforcement beneath sheath or jacket 8 that may be included in hoses made in accordance with the invention. Layer 10 may be comprised of a mixture of fibers such as fiber 3 and fiber 5 previously described that may or may not be disposed in contiguous relationship to each other. Layer 10, however, is preferably composed of fibers of the second fiber 5 type and more preferably of polyester "Dacron" previously described as the latter has been found to provide a good medium onto which to bond sheath or jacket 8. It is to be understood that hoses made in accordance with the invention include those that do not have a braided layer 10 beneath protective jacket 8 as well as those that include braided or pairs of oppositely helically wound layers of reinforcement at any location between core tube 1 and jacket 8 that do not feature fibers 3 and 5 in the alternating contiguous relationship previously described.

Jacket 8 is a protective jacket that is made from a flexible material suitable for the particular application to which hose 30 is to be subjected. Extruded nylon or elastomeric polyurethane has been found to be particularly suitable for jacket 8 due to their respective good abrasion and cut-through resistance.

FIG. 3 shows hose 40 made in accordance with the invention having more than one pair of oppositely helically wound inner and outer layers of fiberous reinforcement having alternating continguous fibers 3 and 5 within each layer. Inner layer 2 and outer layer 4 form one pair and inner layer 12 and outer layer 14 forms the second pair. Fibers 3 and 5 are as previously described. Hose 40 may but is not required to include previously described braided layer 10 and includes core tube 1 and jacket 8 previously described with respect to hose 30. Hose 40 illustrates that hoses made in accordance of the invention are required to have at least one pair of oppositely helically wound layers of reinforcement comprised of alternating contiguous fibers 3 and 5 previously described.

FIG. 4 shows an embodiment of hose 50 made in accordance with the invention that is similar to hose 40 with the exception of having a composite core tube having an inner liner 15 made from a material suitably compatible with the fluid and an outer layer 16. Intermediate half-laps of helically wound layers 2, 4, 12 and 14 and braided layer 10 are bonded to each other and to jacket 8 by a suitable adhesive 20. Layer 2 may also be bonded to the core tube of a hose made in accordance with the invention by adhesive 20. Where layer 16 is made from a solvable material such as a thermoplastic elastomeric polyurethane, layer 2 may be bonded to layer 16 by being at least partially encapsulated in the outer surface of the sovatable layer as a result of softening action of the solvent. As is well known in the art, N-methyl pyrolidone has been found to be a particularly effective solvent for thermoplastic polyurethane as for example disclosed in U.S. Pat. No. 3,722,550, the disclosure of which is incorporated herein by reference and the assignee of which is the same as the assignee of the present invention. Included within the scope of the invention are hose embodiments having a core tube singularly made from solvatable polyurethane with the inner most fiber from solvatable polyurethane with the inner layer bonded thereto by a suitable adhesive or by encapsulation resulting from softening of the tubes outer surface by a suitable solvent.

Hose 50 illustrates that bonded constructions are considered to be included in hoses made in accordance with the invention where the core tube has at least a dual wall and/or the bonding is achieved by any suitable means. Suitable adhesives include, but are not limited to, hot melt, liquid cast and moisture curing type adhesives well known to those skilled in the art of bonded hose constructions.

The surprising improvement in resistance to flexural fatigue of hoses made in accordance with the invention is illustrated by way of the following comparative example involving nominal 3/16 inch I.D. hose:

TABLE I

| Sample | A | B | C | D | E |
|---|---|---|---|---|---|
| | | (Sample Construction) | | | |
| Core tube: | Nylon 11 | Hytrel 6356 | Hytrel 6356 | Hytrel 6356 | Hytrel 6356 |

TABLE I-continued

| Sample | A | B | C | D | E |
|---|---|---|---|---|---|
| | | | (Sample Construction) | | |
| Reinforcement: | Braided layer of 1500 denier Kevlar-Zero twist | 1st half-lap 1500 denier Kevlar-twist of 2½ turns per inch<br><br>2nd half-lap 1500 denier of 2½ turns per inch | 1st & 2nd half-laps 1500 denier Kevlar-twist of 2½ turns per inch alternating with 840 denier Dacron polyester-twist of 2½ turns per inch | 1st & 2nd half-laps 1500 denier Kevlar-twist of 2½ turns per inch | 1st & 2nd half-laps alternating 1500 denier Kevlar-twist of 2½ turns per inch and 840 denier Dacron polyester twist of 2½ turns per inch |
| | Braided layer of 1100 denier Dacron polyester-zero twist | — | — | 3rd & 4th half-laps 1500 denier Kevlar-twist of 1½ turns per inch | 3rd & 4th half-laps alternating 1500 denier Kevlar-twist of 1½ turns per inch and 840 denier Dacron polyester twist of 1½ turns per inch |
| Jacket: | Polyurethane | Polyurethane | Polyurethane | Polyurethane | Polyurethane |
| Bond: | Jacket to Dacron layer bonded by means of moisture cure adhesive | All layers bonded by means of moisture cure adhesive | All layers bonded by means of moisture cure adhesive | All layers bonded by means of moisture cure adhesive | All layers bonded by means of moisture cure adhesive |

1. 6356 is a Shore D 63 polyester sold under the "Hytrel" Trademark by the Dupont Company.

Samples A, B and C in above Table I have a nominal core I.D of about 0.198 inch and a nominal jacket O.D. of about 0.345 inch and Samples D and E have a nominal core I.D of about 0.192 inch and a nominal jacket O.D of about 0.380 inch.

Assemblies of above Samples A–E were subject to the following described tests:

(1) Flex Impulse: 18 inch free length bent in middle to "U" configuration having 1.5 inch radius. Impulsed with 180° F. oil from 0–4000 psi at 70 cycles per minute while free ends moved away frm and toward each other 4 inches at the rate of 35 cycles per minute.

(2) Static Impulse: Same as (1) only without flexing.

(3) Volume Expansion: comparison between initial and final volume of fluid in cubic centimeters per foot contained by 19.25 inch of hose for pressures of 500, 1000, 2000 and 3000 psi.

(4) Burst: pressure at which hose bursts at ambient temperature and rate of pressure rise of approximately 1000 psi per sec.

Following Table II shows the results obtained for Samples A–E of Table I under the above described tests.

TABLE II

| Test | Sample | | | | |
|---|---|---|---|---|---|
| | A | B | C | D | E |
| Flex Impulse: (cycles to failure) | 264,018<br>338,989<br>— | 1,600<br>2,241<br>2,575 | 966,372<br>966,37<br>— | —<br>—<br>— | —<br>—<br>— |
| Static Impulse (cycles to failure) | | | | 15,014<br>155,908<br>— | 46,727*<br>307,904<br>307,909 |
| Volumetric Expansion cc/ft: | | | | | |
| 500 psi | .18 | — | .11 | — | — |
| 1000 psi | .25 | .21 | .21 | .145 | .28 |
| 2000 psi | .44 | .29 | .27 | .463 | .50 |

TABLE II-continued

| Test | Sample | | | | |
|---|---|---|---|---|---|
| | A | B | C | D | E |
| 3000 psi | .51 | .34 | .37 | .547 | .70 |
| Burst: | | | | | |
| psi @ 70 degrees F. | 14,300<br>15,600<br>— | 16,000<br>17,000<br>17,000 | 14,000<br>15,000<br>16,000 | 24,000<br>27,000<br>— | 24,000<br>26,400<br>27,000 |

*Hose damaged in assembly

Samples C and E are made in accordance with the invention. Sample C is directly comparative to Samples A–B and Sample E is directly comparable to Sample D. It is clear from the results shown in Table II above that while retaining substantially equivalent burst and volume expansion characteristics, the flex impulse life of Sample C is more than three hundred times longer than Sample B (all Kevlar reinforcement) and about three times longer than Sample A which combines Dacron and Kevlar fiber but not in alternating contiguous arrangement within each layer.

It is also clear that Sample E is provided with substantially equivalent volumetric expansion characteristics and burst characteristics of Sample D (all Kevlar reinforcement) but exhibits a pulse-flex life that is at least three times as long.

Although not completely understood, it is surmised that interposing lower strength fibers such as Dacron polyester fibers between high strength fibers made from materials such as Kevlar in alternating contiguous relationship prevents the high strength fibers from rubbing against and abrading each other as well as dampening the shock load while the hose is expanding and contracting from pressure changes and/or being flexed in some manner with the result of a substantial improvement in resistance to flexural fatigue.

What is claimed is:

1. An improved flexible reinforced hose adapted for use in the conveyance of fluids under pressure, said hose comprising a core tube, at least one pair of oppositely helically wound inner and outer layers of reinforcing material disposed under tension about the core tube, and a protective jacket disposed about the reinforcement material, said reinforcement layers comprising a composite of synthetic fibers comprising a first synthetic fiber having a tenacity of from 12 to about 25 grams per denier with an elongation at break of about 2% to about 8% and a second synthetic fiber having a tenacity of from about 7 to 11 grams per denier and an elongation at break of from about 9% to about 17%, and said improvement characterized by said hose being provided with improved resistance to flexural fatigue as a result of said first and second fibers being disposed in alternating contiguous relationship to each other within each of said layers.

2. The hose of claim 1 wherein said inner reinforcement layer is disposed adjacent the core tube.

3. The hose of claim 2 wherein at least said inner reinforcement layer is bonded to the core tube.

4. The hose of claim 1 wherein the core tube has a composite wall comprising an inner layer made from a material suitable for conveying the fluid and outer layer made from a solvatable material and said inner reinforcement layer is disposed adjacent said core tube outer layer and bonded thereto.

5. The hose of claim 4 where the core tube inner layer material is a nylon and the core tube outer layer material is a polyurethane.

6. The hose of claims 4 or 5 wherein the bond between said reinforcement layer and said core tube outer layer is provided by at least a portion of the fibers of said layer being at least partially encapsulated by said polyurethane layer as a result of softening action by a solvent.

7. The hose of claim 1 including at least one additional layer of fiberous reinforcement between the core tube and the jacket.

8. The hose of claim wherein the reinforcement is a braided reinforcement.

* * * * *